United States Patent
Hoehn et al.

(10) Patent No.: US 10,569,750 B2
(45) Date of Patent: Feb. 25, 2020

(54) FUZZY-BASED CONTROL SYSTEM IN A MOTOR VEHICLE FOR CONTROLLING A SPEED OF THE MOTOR VEHICLE OR A BRAKE PRESSURE OF A BRAKE OF THE MOTOR VEHICLE

(71) Applicant: Lucas Automotive GmbH, Koblenz (DE)

(72) Inventors: Andreas Hoehn, Hoehr-Grenzhausen (DE); Alexander Rams, Koblenz (DE)

(73) Assignee: Lucas Automotive GmbH, Koblenz (DE)

(*) Notice: Subject to any disclaimer, the term of this patent is extended or adjusted under 35 U.S.C. 154(b) by 123 days.

(21) Appl. No.: 15/662,333

(22) Filed: Jul. 28, 2017

(65) Prior Publication Data

US 2018/0029568 A1   Feb. 1, 2018

(30) Foreign Application Priority Data

Jul. 29, 2016   (DE) .................. 10 2016 009 257

(51) Int. Cl.
  *B60T 8/174*   (2006.01)
  *B60T 8/1763*   (2006.01)
  *B60T 8/171*   (2006.01)

(52) U.S. Cl.
  CPC ........... *B60T 8/174* (2013.01); *B60T 8/171* (2013.01); *B60T 8/1763* (2013.01); *B60T 2210/122* (2013.01); *B60T 2250/03* (2013.01)

(58) Field of Classification Search
  USPC ............................................. 701/77
  See application file for complete search history.

(56) References Cited

U.S. PATENT DOCUMENTS 4,842,342 A * 6/1989 Takahashi ............... B60T 8/174
  303/181
5,172,785 A * 12/1992 Takahashi .............. B60K 28/06
  180/271

(Continued)

FOREIGN PATENT DOCUMENTS

DE   4317050 A1   11/1994
WO   9602880 A1   2/1996

OTHER PUBLICATIONS

PCT International Search Report, Application No. PCT/EP2017/068357, dated Oct. 19, 2017.

*Primary Examiner* — Tyler D Paige
(74) *Attorney, Agent, or Firm* — MacMillan, Sobanski & Todd, LLC

(57) ABSTRACT

A fuzzy-based control system in a motor vehicle for controlling a speed comprises a brake pressure measurement unit, a signal processing unit and a control unit. The brake pressure measurement unit is adapted as a finite state machine to measure a current brake pressure of a brake of a wheel of the motor vehicle dependent on a trigger. The signal processing unit is adapted to estimate a current adhesion value $\mu$ between a tyre associated with the wheel and the current ground, based on the current brake pressure of the brake and further measurement values. The estimating comprises an inference based on fuzzy rules and a fuzzification, a subsequently a defuzzification of the inference. The control unit is adapted to control a speed of the motor vehicle or the brake pressure of the brake, based on the estimated current adhesion value $\mu$.

7 Claims, 8 Drawing Sheets

(56) References Cited

U.S. PATENT DOCUMENTS

| | | | |
|---|---|---|---|
| 5,229,955 A | 6/1993 | Nishiwaki et al. | |
| 5,416,709 A * | 5/1995 | Yeh | B60T 8/174 |
| | | | 303/168 |
| 2012/0025600 A1* | 2/2012 | Cabrera Carrillo | B60T 8/17616 |
| | | | 303/119.1 |
| 2018/0029568 A1* | 2/2018 | Hoehn | B60T 8/171 |

* cited by examiner

| Event | Description |
|---|---|
| E1 | $Start\_Condition\_Timer == 0s$ |
| E2 | $Slip\_Filtered >= TARGET\_SLIP$ OR $Request\_Timer >= MAX\_REQUEST\_TIME$ |
| E3 | $Pressure\_Request >= MAX\_PRESSURE\_REQUEST$ |
| E4 | $Request\_Timer >= MAX\_REQUEST\_TIME$ OR $Hold\_Timer >= MAX\_HOLD\_TIME$ |
| E5 | $Pressure\_Estimation == 0Bar$ |

Fig. 4

| No. | IF | VehSpeed | & | Pressure | & | Slip | & | YawError | THEN | Result |
|---|---|---|---|---|---|---|---|---|---|---|
| 1 | IF | VeryLow | & | Low | & | High | & | Low | THEN | Ice |
| 2 | IF | Low | & | Low | & | High | & | Low | THEN | Ice |
| 13 | IF | VeryLow | & | Mid | & | Mid | & | Mid | THEN | Wet |
| 14 | IF | Low | & | Mid | & | Mid | & | Mid | THEN | Wet |
| 19 | IF | VeryLow | & | High | & | Mid | & | High | THEN | Dry |
| 20 | IF | Low | & | High | & | Mid | & | High | THEN | Dry |
| 21 | IF | Mid | & | High | & | Low | & | High | THEN | Dry |

Fig.7A

| Fuzzy Operator | Realization |
|---|---|
| AND | Minimum |
| Intersection | Minimum |
| OR | Maximum |
| Union | Maximum |
| Implication | Minimum (clipping) |

Fig.7B

FUZZY-BASED CONTROL SYSTEM IN A MOTOR VEHICLE FOR CONTROLLING A SPEED OF THE MOTOR VEHICLE OR A BRAKE PRESSURE OF A BRAKE OF THE MOTOR VEHICLE

CROSS-REFERENCE TO RELATED APPLICATIONS

This application claims priority to German Patent Application No. 10 2016 009 257.2, filed 29 Jul. 2016, the disclosures of which are incorporated herein by reference in entirety.

BACKGROUND OF THE INVENTION

A fuzzy-based control system in a motor vehicle for controlling a speed of the motor vehicle or a brake pressure of a brake of the motor vehicle is disclosed here.

An anti-lock braking system in a motor vehicle prevents one or more wheels of the motor vehicle from locking in a braking action. This locking means that, although the motor vehicle does not stop, the wheels no longer turn and they slide over the ground. In this process not only is the wheel or tyre damaged, but the locked wheel or wheels can no longer be used for steering the motor vehicle. The braking distance is also lengthened, as the friction is reduced.

The braking action consists of a braking deceleration, which in each motor vehicle is a function only of two values, the acceleration due to gravity and the adhesion value $\mu$. The task of the anti-lock braking system is to set a slip for the ground under the vehicle in each case according to an adhesion value, so that the optimal force can be transmitted to the ground. The force is usually visualised by way of a $\mu$-slip curve. This curve has a defined transmissible braking force amount for a certain slip.

BRIEF SUMMARY OF THE INVENTION

The feature is now to make available a control system with which a current adhesion value $\mu$ between tyre and ground can be determined in the driving dynamics limit range and beyond.

According to a first aspect, a fuzzy-based control system is provided in a motor vehicle for controlling a speed. The fuzzy-based control system comprises a brake pressure measurement unit, a signal processing unit and a control unit. The brake pressure measurement unit is adapted as a finite state machine to measure a current brake pressure of a brake of a wheel of the motor vehicle dependent on a trigger. The signal processing unit is adapted to estimate a current adhesion value $\mu$ between a tyre associated with the wheel and the current ground, based on the current brake pressure of the brake and further measurement values. The estimating comprises an inference based on fuzzy-rules and a fuzzification, and subsequently a defuzzification of the inference. The control unit is adapted to control a speed of the motor vehicle or the brake pressure of the brake, based on the estimated current adhesion value $\mu$.

The advantage of this configuration lies in the fact that a maximum road adhesion value can be determined even outside a driving dynamics limit range.

Fuzzy-based in this context can mean that a fuzzy logic is used. The brake pressure can be measured continuously or can be measured starting out from a brake pressure request.

A finite state machine can be implemented in the control unit.

The finite state machine can assume 4 states. These states can be: rest state, request state, hold state and ramp state. The finite state machine can be in the rest state when the finite state machine was triggered externally. This triggering can be effected by an upstream $\mu$ estimation. If the upstream $\mu$ estimation yields an imprecise or indefinite value for the $\mu$ estimation, the triggering can take place. On triggering, the calculation of the adhesion value $\mu$ can be initiated. Start conditions for the calculation of the adhesion value $\mu$ can be an exceeding/falling below of a predetermined acceleration value and/or an exceeding/falling below of a predetermined rotation angle or of a predetermined rotation direction of the wheel of the motor vehicle. If a start condition timer assumes a value of 0, the finite state machine can change to a request state. In the request state a brake pressure request can be calculated. This calculation can be carried out up to a desired slip. In this case the brake pressure request can be effected with a predefined brake pressure gradient until a desired slip is reached. If the desired slip is reached or a request timer reaches a maximum request time, the finite state machine can change to the hold state. If a maximum brake pressure request is reached in the request state, the finite state machine can change to the ramp state. In the hold state the brake pressure request can be set to the currently estimated brake pressure. This can lead to a steady brake pressure. A duration of the hold state can be limited by a maximum time. During the hold state, the desired slip can deviate from the current slip. If the maximum request time or a maximum hold time is reached in the hold state, the finite state machine can change to the ramp state. In the ramp state the finite state machine can change back to the rest state if an estimation of the brake pressure power assumes the value 0.

This additional configuration has the advantage of measuring the vehicle reaction in a build-up of brake pressure and of determining the current adhesion value from the measured values via a fuzzy logic.

It is utilised in this case that a mean value of the slip can be adapted to the external circumstances by the fuzzy logic.

The time in the hold state can be limited by a maximum time. In the ramp state the brake pressure request can be masked out. This can prevent an abrupt jolt, which would be uncomfortable for a driver.

The further measurement values can be a speed, a slip and/or a yaw rate. These three measurement values can be understood in connection with the current brake pressure as input values for the signal processing unit.

The fuzzification can comprise a mapping of the measured brake pressure and the further measurement values onto suitably weighted objects of a fuzzy set via membership functions. The fuzzy set can comprise linguistic expressions. The linguistic expressions with reference to the brake pressure/the yaw rate/the speed/the slip can be "very low", "low", "medium", "high" and/or "very high". Linguistic expressions with reference to the road can be "very dry", "dry", "wet", "very wet", "cold", "very cold", "warm", "very warm".

The membership functions can determine the grade of membership of an object of a fuzzy set. The measured brake pressure and the further measurement values can each have several memberships of objects of a fuzzy set. The fuzzy logic makes it possible that values can be located between respective memberships of objects of a fuzzy set.

The fuzzy rules can constitute a set of rules that links defined objects of a fuzzy set by logical operations in such a way that from these the condition of a road surface on which the motor vehicle is currently driving is to be estimated.

The fuzzy rules can be based on empirical investigations and represent physical relationships.

The inference can further comprise the forming of a membership of an object of a fuzzy set. The membership can be a linguistic membership. The membership can be the result of fuzzy rules applied to the fuzzification of the measured brake pressure and the further measurement values, and their logical operation from this.

The defuzzification can further comprise a reverse mapping of a result from the inference onto the estimated current adhesion value $\mu$. The result can correspond to an object of a fuzzy set, which can be weighted accordingly. Accordingly weighted can be understood here as the grade of membership of the object of the fuzzy set.

The defuzzification can further take place via combined membership functions, which can be used to calculate the current adhesion value $\mu$ in connection with a singleton centre of gravity method.

The fuzzy sets cited here can differ in the steps of fuzzification, inference and defuzzification.

Other advantages of this invention will become apparent to those skilled in the art from the following detailed description of the preferred embodiments, when read in light of the accompanying drawings.

BRIEF DESCRIPTION OF THE DRAWINGS

FIG. 4 shows a schematic representation of an event log of a finite state machine according to an exemplary embodiment;

FIG. 7A shows a schematic representation of fuzzy rules according to an exemplary embodiment;

FIG. 7B shows a schematic representation of fuzzy operators and a realisation according to an exemplary embodiment;

DETAILED DESCRIPTION OF THE PREFERRED EMBODIMENTS

Figure 1:
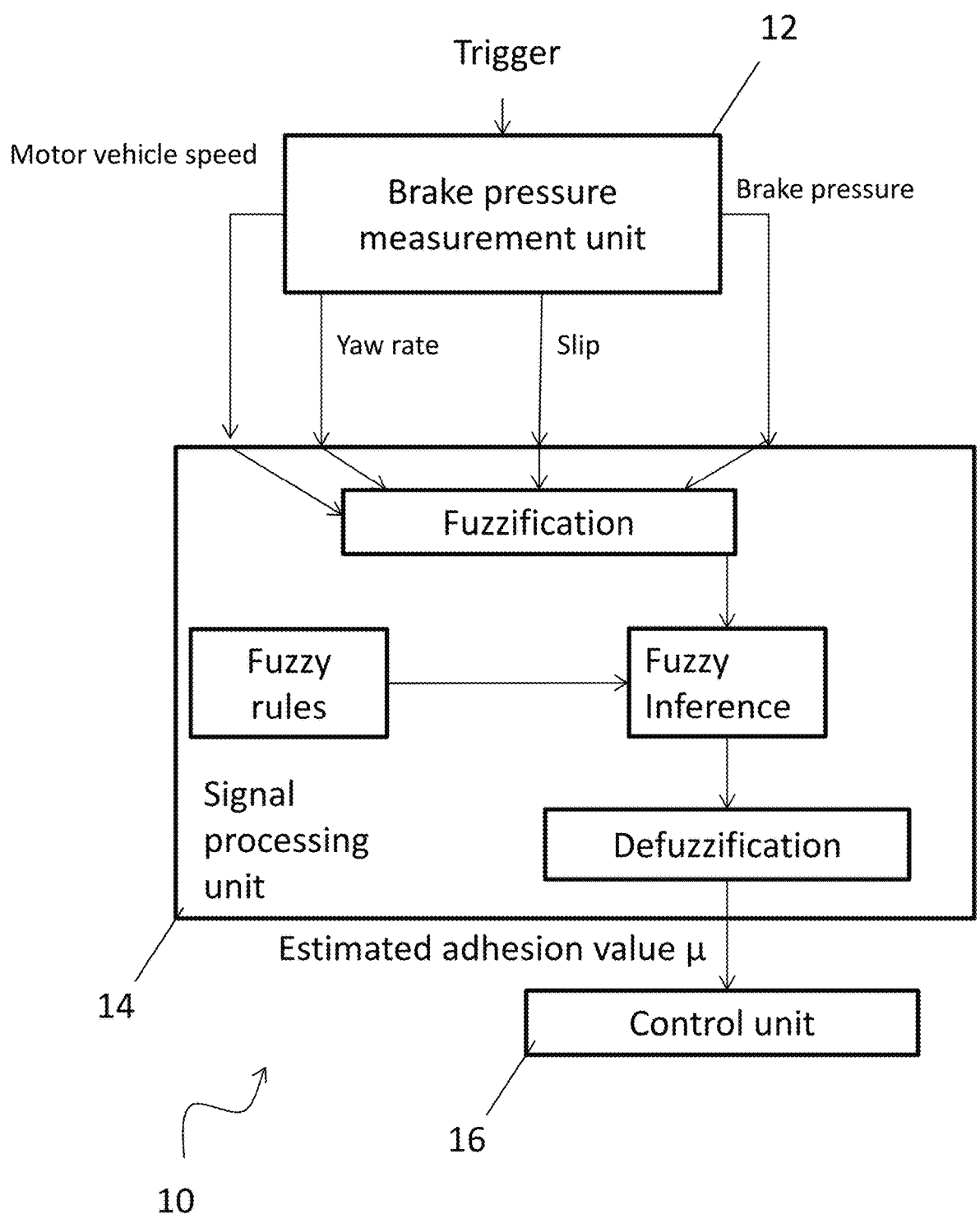
FIG. 1 shows a schematic representation of an exemplary embodiment.

FIG. 1 shows by way of example and schematically a structure of an exemplary embodiment. A fuzzy-based control system 10 is shown here. The brake pressure measurement unit 12 is triggered via a trigger. The brake pressure measurement unit forwards the motor vehicle speed, the yaw rate, the slip and the brake pressure to the signal processing unit 14. In the signal processing unit 14, an adhesion value $\mu$ is estimated via a fuzzification and fuzzy rules, a fuzzy inference and a subsequent defuzzification of the signal processing unit 14, which value is forwarded to the control unit 16. The control unit 16 controls a speed and/or a current brake pressure for one or more wheels of the motor vehicle.

Figure 2:
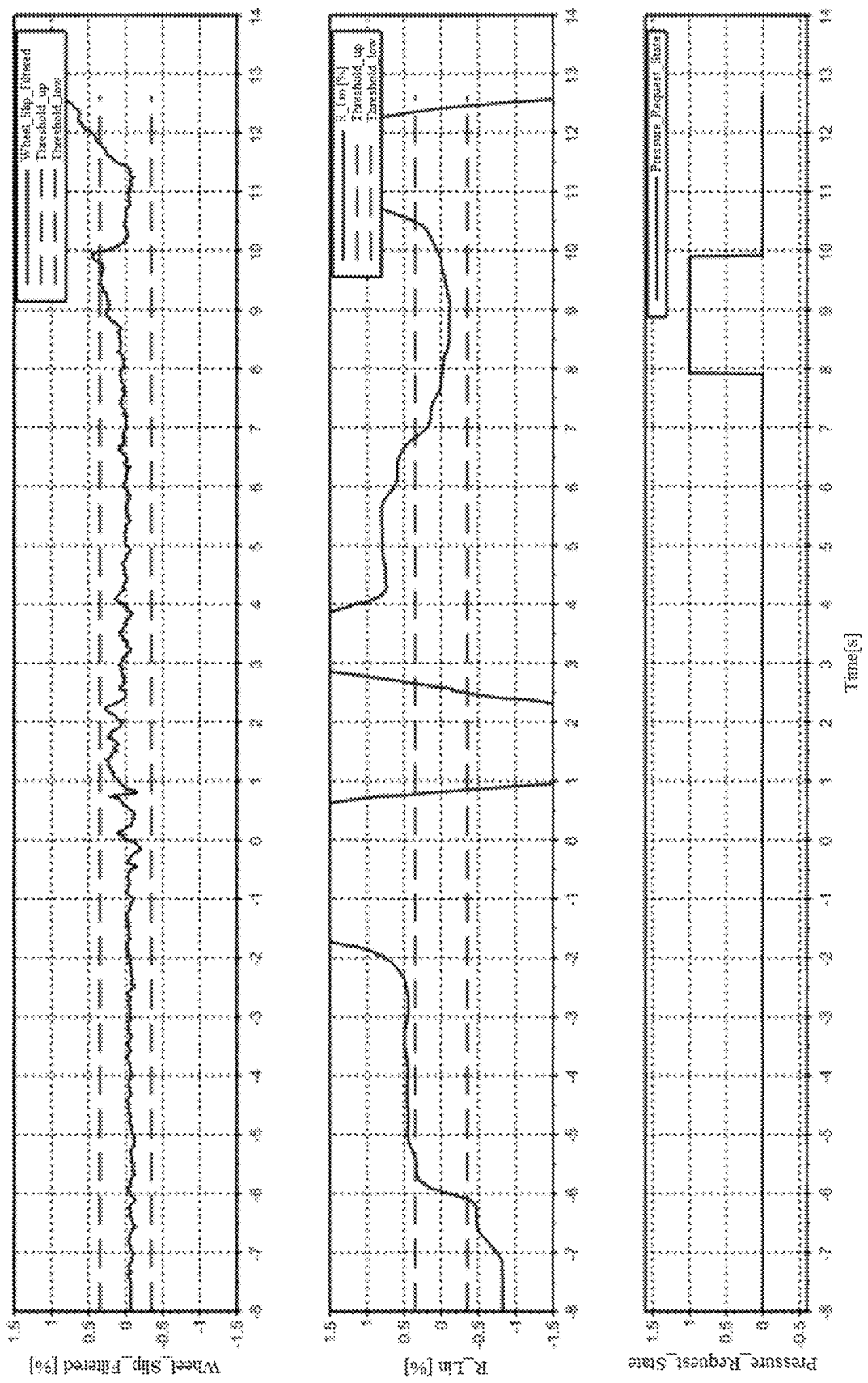
FIG. 2 shows a schematic representation for a triggering of the brake pressure measurement unit according to an exemplary embodiment.

FIG. 2 shows by way of example and schematically a progression of start conditions that must be fulfilled so that an implementation according to the present invention takes place. For this a start condition timer is shown in the bottom line of FIG. 2, which is reset if the conditions are not fulfilled. Only when the start condition timer reaches the value 0 does a trigger activate the brake pressure measurement unit, as shown in FIG. 1.

Figure 3:
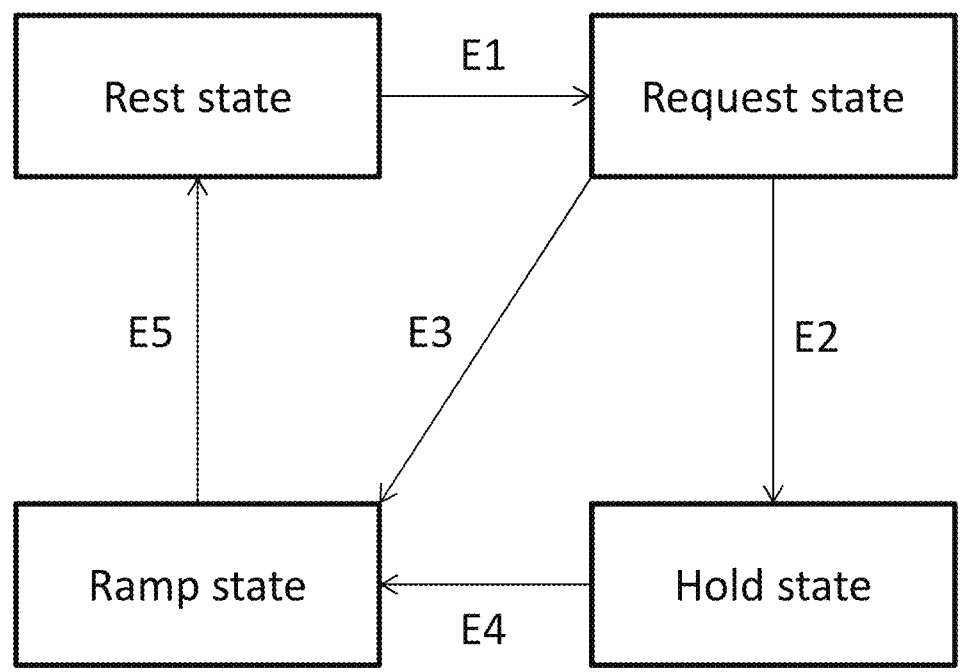
FIG. 3 shows a schematic representation of a state diagram of a finite state machine according to an exemplary embodiment.

In FIG. 3, a finite state machine is shown by way of example with 4 different states and 5 different events. These states comprise a rest state, a request state, a hold state and a ramp state. FIG. 4 shows the different events, which lead to the different states of the finite state machine. E1 represents an event for the start condition, in order to reach the request state. E2 represents an event for reaching the hold state from the request state. E3 represents an event for reaching the ramp state from the request state. E4 represents an event for reaching the ramp state from the hold state. E5 represents a request for reaching the rest state from the ramp state.

Figure 5:
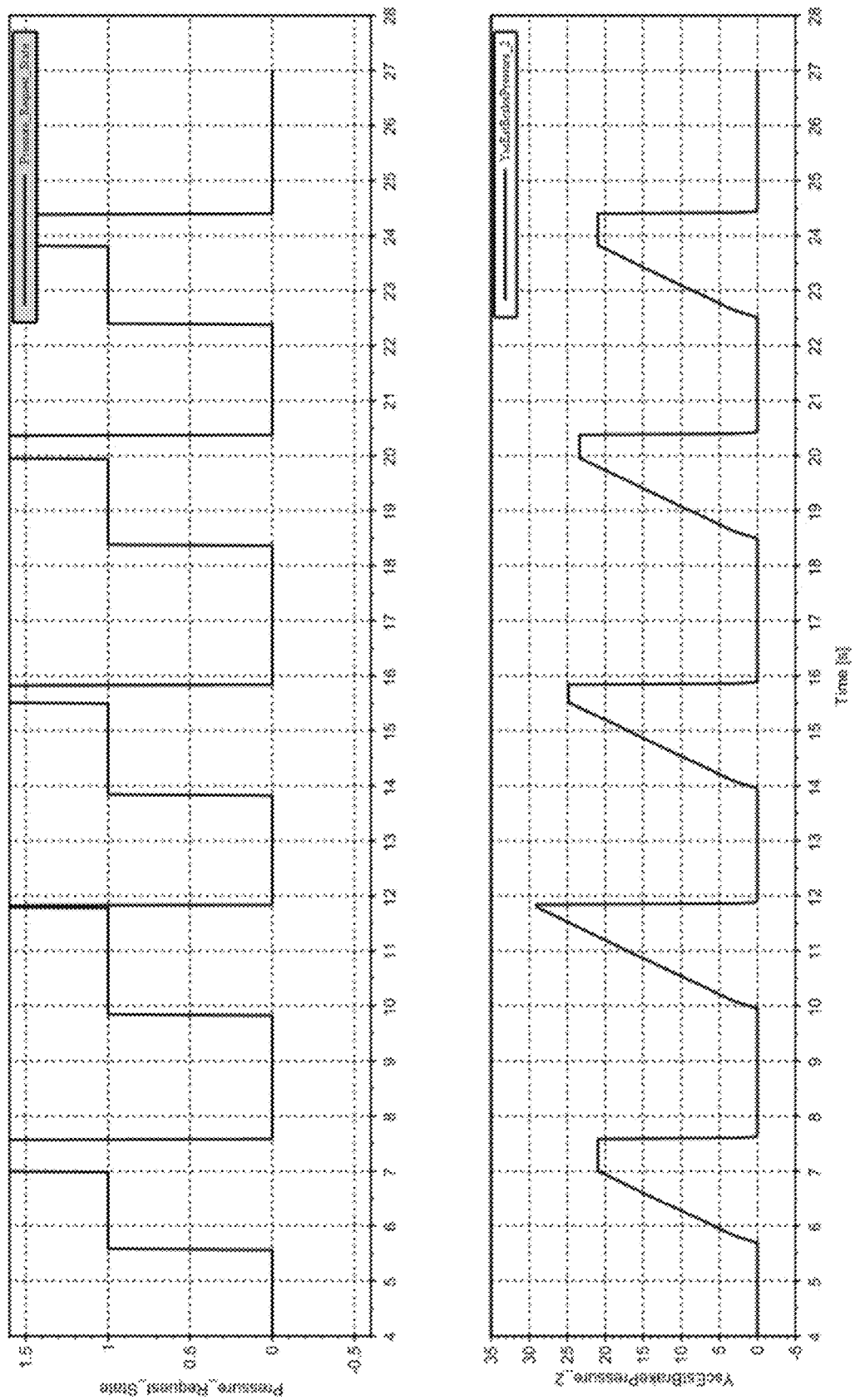
FIG. 5 shows a schematic representation of brake pressure requests in a request state of a finite state machine according to an exemplary embodiment.

A representation of a brake pressure request up to a desired slip is shown as an example and schematically in FIG. 5. The brake pressure request follows a predefined gradient in this case and is cut off by a maximum brake pressure request. The typical curve of the ramp-shaped brake pressure request is shown in FIG. 5. It can be ascertained that the brake pressure progresses like a ramp up to a maximum brake pressure or until the desired slip is reached. If the desired slip is reached, it leads to the hold state. In the hold state the brake pressure request is set to the current estimated brake pressure. This leads to steady brake pressure. If no slip regulator is present, the average slip will deviate from the desired slip. Here an estimated adhesion value $\mu$ from a fuzzy logic estimation is used to set this slip. Thus the desired slip is set. Finally, in the ramp state the motor vehicle is prevented from moving jerkily so that a driver sitting in it does not feel involuntarily exposed to a jolt.

Figure 6A:
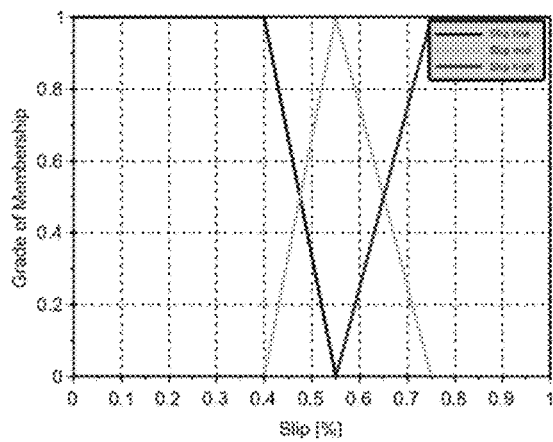
FIG. 6A shows a schematic representation of membership functions of a slip.
Figure 6B:
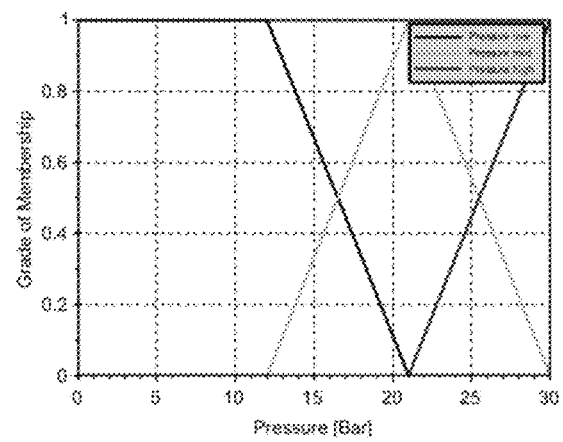
FIG. 6B shows a schematic representation of membership functions of a brake pressure.
Figure 6C:
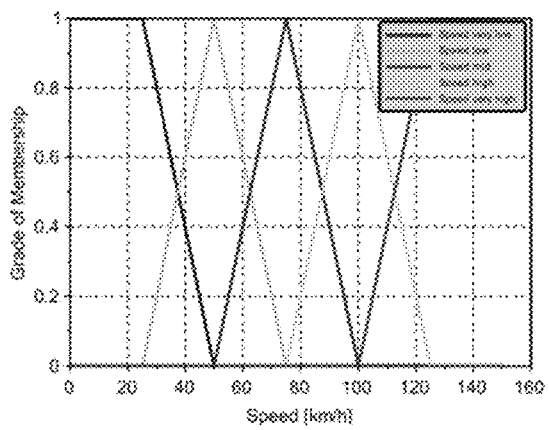
FIG. 6C shows a schematic representation of membership functions of a speed.
Figure 6D:
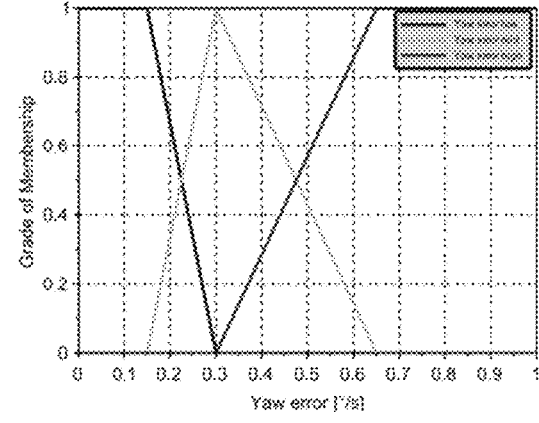
FIG. 6D shows a schematic representation of membership functions of a yaw rate.

FIGS. 6A, 6B and 6C show by way of example membership functions according to the four measurement values: slip, brake pressure, motor vehicle speed and yaw rate. In FIG. 6A, three membership functions are plotted over a slip. The three membership functions comprise low, mid and high slip. There can even be five or more membership functions, e.g. very low, low, mid, high and very high slip. A corresponding grade of membership is determined accordingly by way of the graphs from FIG. 6A. For example, a measured slip of 0.5% produces a fuzzificated slip of (slip_low; slip_mid; slip_high)=(0.375; 0.625; 0). This means that the grade of membership corresponds to a high share of medium slip and a smaller share of low slip and no share of high slip. The same principle is to be applied to FIGS. 6B, 6C and 6D. In FIG. 6B, three membership functions are plotted over a brake pressure. The three membership functions comprise low, mid and high brake pressure. There can even be five or more membership functions, e.g. very low, low, medium, high and very high brake pressure. As an example, a measured brake pressure of 12 bar can be mapped via the membership function onto (P_low; P_mid; P_high)=(1; 0; 0). This means that the brake pressure defined by way of the membership function has no membership of medium and high brake pressure, but only of low brake pressure. In FIG. 6C, five membership functions are plotted over a motor vehicle speed. The five membership functions comprise very low, low, mid, high and very high motor vehicle speed. There can also be more membership functions. As an example, a measured motor vehicle speed of 50 km/h or 60 km/h can be mapped by way of the membership functions onto a grade of membership of (V_very_low; V_low; V_mid; V_high; V_very high)=(0; 1; 0; 0; 0) or (V_very_low; V_low; V_mid; V_high; V_very high)=(0; 0.6; 0.4; 0; 0). In FIG. 6D, three membership functions are plotted over a yaw rate. The three membership functions comprise low, mid and high yaw rate. There can even be five or more membership functions, e.g. very low, low, mid, high and very high yaw rate. For example, a measured yaw rate of 0.3°/s or 0.48°/s can be mapped via the membership functions onto (yaw_low; yaw_mid; yaw_high)=(0; 1; 0) or (yaw_low; yaw_mid; yaw_high)=(0; 0.5; 0.5). The sum of all defined memberships for a measured value generally yields a value of 1. The grade of membership in this exemplary implementation represents the percentage share of a linguistic mapping starting out from a measured value.

FIG. 7A shows, by way of example and schematically, fuzzy rules according to an exemplary embodiment of the present invention. These rules represent links between the linguistic mappings of the associated measured values and the linguistic value for the road condition/ground necessary for an inference. An adhesion value µ can be estimated by way of these in combination with FIG. 7B via a defuzzification. As an example, it results from column 1 from FIG. 7A that for case no. 1 in line 2 of the table, a linguistic mapping/result can be inferred from the respective linguistic memberships of the four measurement values motor vehicle speed, brake pressure, slip and yaw rate. For example, it can be concluded from a very low motor vehicle speed, a low brake pressure, a high slip and a low yaw rate that the ground must be icy (see "ICE" in FIG. 7A). This result can then be used to be able to estimate an arithmetic value. This is illustrated in FIGS. 8A and 8B.

Figure 8A:
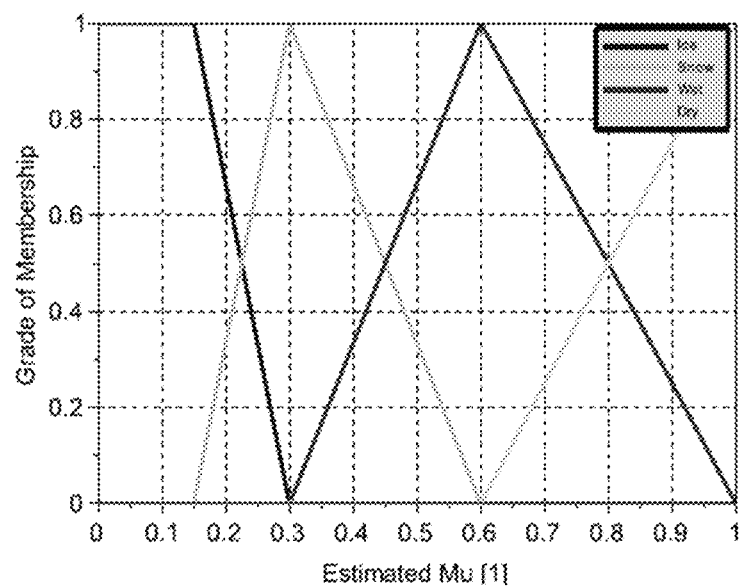
FIG. 8A shows a schematic representation of membership functions of a road surface/ground according to an exemplary embodiment.
Figure 8B:
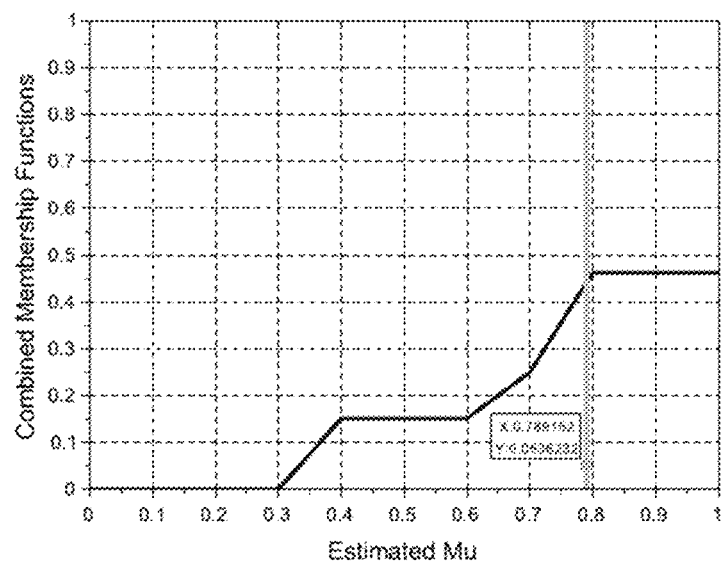
FIG. 8B shows a schematic representation of a common membership function according to an exemplary embodiment.

FIG. 8A describes four membership functions for a ground that has ice, snow, wet, dryness, for example. These properties can describe a ground. Via the defuzzification the object of the fuzzy set, here the linguistic expression, can be mapped back onto an adhesion value. To do this, an adhesion value is estimated via the membership functions. Furthermore, using a maximum operator via the connection of all fuzzy rules, a certain initial set can be calculated, wherein a corresponding combined membership function is clipped by the maximum value. This clipped membership function is shown in FIG. 8B. It further represents the case that estimated adhesion values for dry and wet µ_dry=0.45 and µ_wet=0.15 yield a relatively precise adhesion value of µ_est_precise=0.79. For this process a singleton centre of gravity method can be used, with which according to the centre of gravity set and the following formula $$\mu est, \text{precise} = CoS = \frac{\sum i\mu i \cdot mf(\mu i)}{\sum imf(\mu i)}$$

an estimated adhesion value µ_est, precise can be calculated. µ_est,precise here represents the estimation value calculated by the singleton centre of gravity method using the combined membership function mf (µ_i) for the function value µ=µ_i.

The method variants described here and their functional and operational aspects serve only for a better understanding of their structure, mode of operation and properties; they do not restrict the disclosure to the exemplary embodiments, for instance. The figures are partly schematic, wherein substantial properties and effects are shown significantly enlarged in part, in order to clarify the functions, active principles, technical configurations and features. In this case each mode of operation, each principle, each technical configuration and each feature, which is/are disclosed in the figures or in the text, can be combined freely and in any way with all claims, each feature in the text and in the other figures, other modes of operation, principles, technical configurations and features, which are contained in this disclosure or result from it, so that all conceivable combinations are to be associated with the devices described. In this case even combinations between all individual implementations in the text, meaning in each section of the description, in the claims and even combinations between different variants in the text, in the claims and in the figures are comprised and can be made the object of further claims. The claims also do not limit the disclosure and thus the combination possibilities of all demonstrated features with one another. All disclosed features are disclosed here explicitly also individually and in combination with all other features.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A fuzzy-based control system in a motor vehicle for controlling a speed, the fuzzy-based control system comprising:
   a brake pressure measurement unit for measuring a current brake pressure of a brake of a wheel of the motor vehicle, wherein the brake pressure measurement unit is adapted as a finite state machine to measure the current brake pressure of the brake of the wheel dependent on a trigger from an upstream adhesion value measurement;
   a signal processing unit, which is adapted to estimate a current adhesion value between a tyre associated with the wheel and a current ground, based on the current brake pressure of the brake measured by the brake pressure measurement unit and further measurement values, wherein estimating includes an inference based on fuzzy rules and a fuzzification, and subsequently a defuzzification of the inference, wherein the brake pressure measurement unit forwards the measured brake pressure to the signal processing unit; and
   a control unit, which is adapted to control a speed of the motor vehicle or the brake pressure of the brake, based on the estimated current adhesion value estimated by the signal processing unit and forwarded to the control unit by the signal processing unit.

2. The fuzzy-based control system according to claim 1, wherein the fuzzification comprises mapping of the measured brake pressure and the further measurement values via membership functions onto correspondingly weighted objects of a fuzzy set.

3. The fuzzy-based control system according to claim 2, wherein the membership functions determine a grade of membership of an object of a fuzzy set, and wherein the measured brake pressure and the further measurement values can each have several memberships of objects of the fuzzy set.

4. The fuzzy-based control system according to claim 1, wherein the fuzzy rules constitute a set of rules, which links determined objects of a fuzzy set by a logical operation so that a condition of a road surface on which the motor vehicle is currently driving is to be estimated from these.

5. The fuzzy-based control system according to claim 1, wherein the inference further comprises formation of a membership of an object of a fuzzy set, and wherein the membership is the result of fuzzy rules applied to the fuzzification of the measured brake pressure and the further measurement values and their logical operation therefrom.

6. The fuzzy-based control system according to claim 1, wherein the defuzzification further comprises reverse mapping of a result of the inference onto the estimated current adhesion value.

7. The fuzzy-based control system according to claim 1, wherein the defuzzification further takes place via combined membership functions, which are used to calculate the current adhesion value in connection with a singleton centre of gravity method.

* * * * *